(12) United States Patent
Tiberghien et al.

(10) Patent No.: US 7,782,164 B2
(45) Date of Patent: Aug. 24, 2010

(54) MAGNETIC CLAMPING DEVICE, AN INJECTION MOULDING MACHINE COMPRISING SUCH A DEVICE AND A METHOD FOR MANUFACTURING SUCH A DEVICE

(75) Inventors: Alain-Christophe Tiberghien, Sevrier (FR); Eric Brun, Doussard (FR)

(73) Assignee: Staubli Faverges, Faverges (FR)

( * ) Notice: Subject to any disclaimer, the term of this patent is extended or adjusted under 35 U.S.C. 154(b) by 423 days.

(21) Appl. No.: 11/808,395

(22) Filed: Jun. 8, 2007

(65) Prior Publication Data

US 2007/0290780 A1     Dec. 20, 2007

(30) Foreign Application Priority Data

Jun. 16, 2006   (FR) .................................. 06 05380

(51) Int. Cl.
*H01F 7/20*    (2006.01)
(52) U.S. Cl. ....................... 335/285; 335/289
(58) Field of Classification Search ................. 335/289, 335/302–306; 269/8
See application file for complete search history.

(56) References Cited

U.S. PATENT DOCUMENTS

| 6,104,270 | A  | * | 8/2000 | Elias ........................... 335/289 |
| 6,489,871 | B1 |   | 12/2002 | Barton |
| 6,636,153 | B1 | * | 10/2003 | Barton et al. ............... 340/680 |
| 7,068,134 | B2 | * | 6/2006 | Olsen ......................... 335/291 |

FOREIGN PATENT DOCUMENTS

| DE | 20001927 U1 | 6/2000 |
| FR | 1434671 A   | 4/1966 |
| WO | 03/009972 A2 | 2/2003 |

* cited by examiner

*Primary Examiner*—Elvin G Enad
*Assistant Examiner*—Bernard Rojas
(74) *Attorney, Agent, or Firm*—Dowell & Dowell, PC

(57) ABSTRACT

A magnetic clamping device includes a clamping support and at least two magnetic pads housed in the support, each pad having a magnet that can be switched between an activated state and a deactivated state. Each pad has at least one solenoid coil each end of which is connected to a terminal with the terminals of at least two pads being connected to each other by removable connectors.

15 Claims, 6 Drawing Sheets

MAGNETIC CLAMPING DEVICE, AN INJECTION MOULDING MACHINE COMPRISING SUCH A DEVICE AND A METHOD FOR MANUFACTURING SUCH A DEVICE

BACKGROUND OF THE INVENTION

Field of the Invention

The present invention relates to a magnetic clamping device, an injection moulding machine comprising such a device and a method for manufacturing such a device.

U.S. Pat. No. 6,489,871 describes a magnetic clamping plate comprising magnetic pads capable of generating a magnetic flux in a ferromagnetic workpiece designed to be clamped against this plate. The clamping force exerted by the plate on the part may be cancelled out by adequately supplying a solenoid coil inside the pads. In this device, the solenoid coils inside the pads are connected in series and connected to a power supply by means of connecting wires, soldered or crimped to each solenoid coil and placed in grooves of the plate filled with insulating material.

Furthermore, WO-A-03/009 972 describes a magnetic clamping plate in which the pads each comprise an additional solenoid coil, designed to measure the flux generated by each pad. These additional solenoid coils are connected in series and connected to a control unit by means of connection wires which, as described above, are soldered or crimped to each flux measurement solenoid coil and placed in grooves of the plate.

The establishment of the connections between the various solenoid coils of the pads during the manufacture of such clamping plates uses a large number of parts and requires highly qualified labour. The placement of the connection wires is a relatively lengthy step in the method for manufacturing a plate, since it is necessary to solder or crimp the wires to each solenoid coil and then insert these wires into the grooves of the plate. The result of this is a considerable time and cost for manufacturing these plates.

SUMMARY OF THE INVENTION

It is these disadvantages that the invention is intended more particularly to remedy by proposing a magnetic clamping device having both a limited manufacturing cost and a high quality level.

Accordingly, the subject of the invention is a magnetic clamping device comprising a clamping support and at least one magnetic pad housed in this support, each pad comprising a magnet that can be switched between an activated state, in which the magnetic flux lines generated by the pad may extend towards the outside of the clamping device, and a deactivated state, in which the magnetic flux lines are confined in the clamping device, each pad comprising at least one solenoid coil, each end of this solenoid coil being connected to a terminal, wherein the terminals of at least one pad are connected to a circuit by means of removable connectors.

According to other advantageous features of the invention:
each pad comprises a solenoid coil for measuring the magnetic flux generated by the pad, each end of the measurement solenoid coil being connected to a measurement terminal, the measurement terminals of at least one pad being connected to a magnetic flux measurement circuit by means of removable connectors;
the device comprises reference pads whose measurement terminals are connected in series to form a first flux measurement circuit, the measurement terminals of the other pads being connected in series to form a second flux measurement circuit, the measurement terminals in the first and second measurement circuits being connected to one another and to a control unit by means of the aforementioned removable connectors;
each pad comprises a continuity terminal and is connected to at least one adjacent pad in the support by means of one of the said connectors, this connector being of a first type when it connects two pads of the same kind amongst the reference pads and the other pads, and of a second type when it connects two pads of different kinds;
a connector of the first type connects together terminals of the same kind amongst the measurement terminals and the continuity terminals of two adjacent pads, while a connector of the said second type connects together terminals of different kinds of two adjacent pads;
each pad comprises a switchable magnet comprising a permanent magnet surrounded by a power solenoid coil, each end of the power solenoid coil being connected to a power terminal, the power terminals of at least one pad being connected to a power circuit by means of removable connectors;
the aforementioned connectors comprise at least one plug furnished with three pins for connection respectively to a measurement terminal, a continuity terminal and a power terminal of a pad;
each terminal of a pad extends over an angular sector with an apex angle greater than or equal to 45°, each pad comprising at least two connection portions for connecting a connector, each connection portion extending over an angular sector with an apex angle greater than or equal to 45°, said connector being capable of being connected simultaneously to three terminals, respectively a measurement terminal, a continuity terminal and a power terminal, on each of said connection portions;
the relative radial distance between the measurement terminals and power terminals of a pad on the one hand, and the relative radial distance between the power terminals and continuity terminal, on the other hand, is constant in each connection portion and identical from one connection portion to another;
each pad comprises two semicircular measurement terminals and two semicircular power terminals, the continuity terminal of each pad being of circular shape and closed, the measurement terminals, continuity terminal and power terminals being placed concentrically relative to one another;
each pad comprises a cylindrical insulating casing, this casing comprising three concentric circumferential grooves for receiving, respectively, the measurement terminals, the continuity terminal and the power terminals of the said pad;
the ends of the measurement solenoid coil are connected to each measurement terminal in a mid-zone of the latter;
the support comprises housings for receiving pads and housings for receiving connectors.

A further subject of the invention is an injection moulding machine comprising a magnetic clamping device as described above.

Finally, the subject of the invention is a method for manufacturing a magnetic clamping device as described above, comprising steps in which:
magnetic pads are inserted into housings of the support and these pads are immobilized relative to the support; and the pads are connected to one another and to a control unit by inserting removable connectors into housings of the support in such a way as to place the connector pins in contact with the terminals of the pads.

BRIEF DESCRIPTION OF THE DRAWINGS

The features and advantages of the invention will appear in the following description of an embodiment of a magnetic clamping device according to the invention given as an example and made with reference to the appended drawings in which.

DESCRIPTION OF THE PREFERRED EMBODIMENTS

Figure 1:
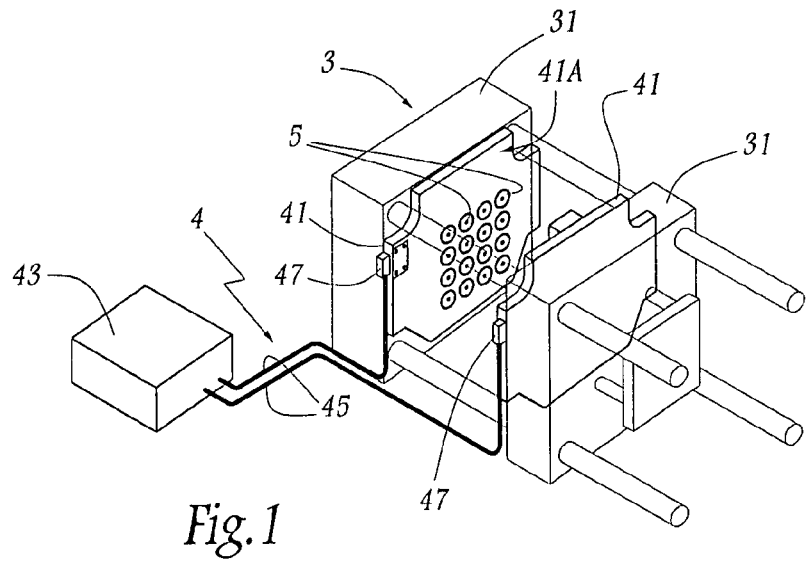
FIG. 1 is a partial view in perspective of an injection moulding machine comprising a magnetic clamping device according to the invention.

The injection moulding machine 3 represented in FIG. 1 comprises two platens 31 placed facing one another, one of these platens 31 being able to move in translation relative to the other. The machine 3 is fitted with a magnetic clamping device 4 comprising two clamping plates 41 attached to each platen 31 at the facing faces of these platens. Each plate 41 comprises magnetic pads 5 housed in the plate and flush with a clamping face 41A of the plate. The device 4 also comprises a control unit 43, that notably comprises a power supply, a control circuit and additional signal processing circuits. The control unit 43 is connected to each plate 41 by means of a cable 45, connected to the plate on a terminal block 47. In addition, the control unit 43 is connected to the machine 3 by means of a cable not shown.

A mould, not shown, consisting of a ferromagnetic material, is designed to be placed between the two plates 41 and immobilized against these plates by magnetic clamping. When a mould is thus clamped between the plates 41, the retraction movement of the movable platen 31 causes the mould to open. The control unit 43 at all times controls the clamping force exerted by each plate 41 on the corresponding portion of the mould.

Figure 10:
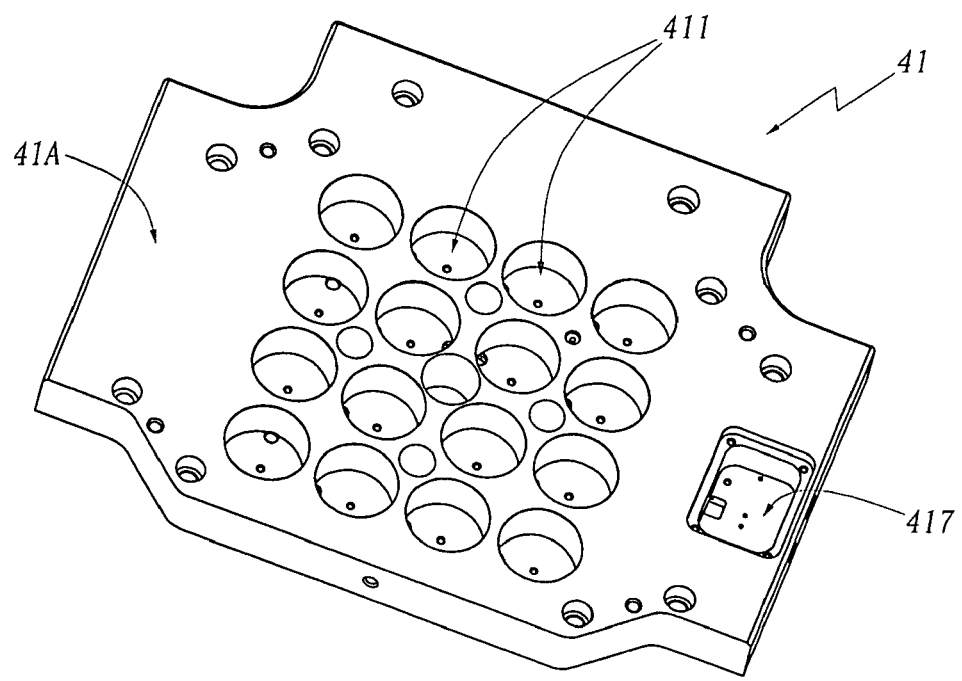
FIG. 10 is a view in perspective of the plate of FIG. 2, from the side of the clamping face, prior to the installation of the magnetic pads and the connection members.

As can be seen in FIG. 10, each plate 41 of the device 4 comprises, at its clamping face 41A, housings 411 for receiving the magnetic pads 5. In the embodiment shown, each plate 41 comprises sixteen generally cylindrical housings 411, capable of receiving sixteen magnetic pads 5 of a shape substantially matching the housings 411. According to a variant of the invention not shown, the number of magnetic pads 5 and of matching housings 411 of a plate 41 may be different from sixteen. The face 41A of each plate 41 also comprises a housing 417 for receiving a terminal block 47.

Figure 11:
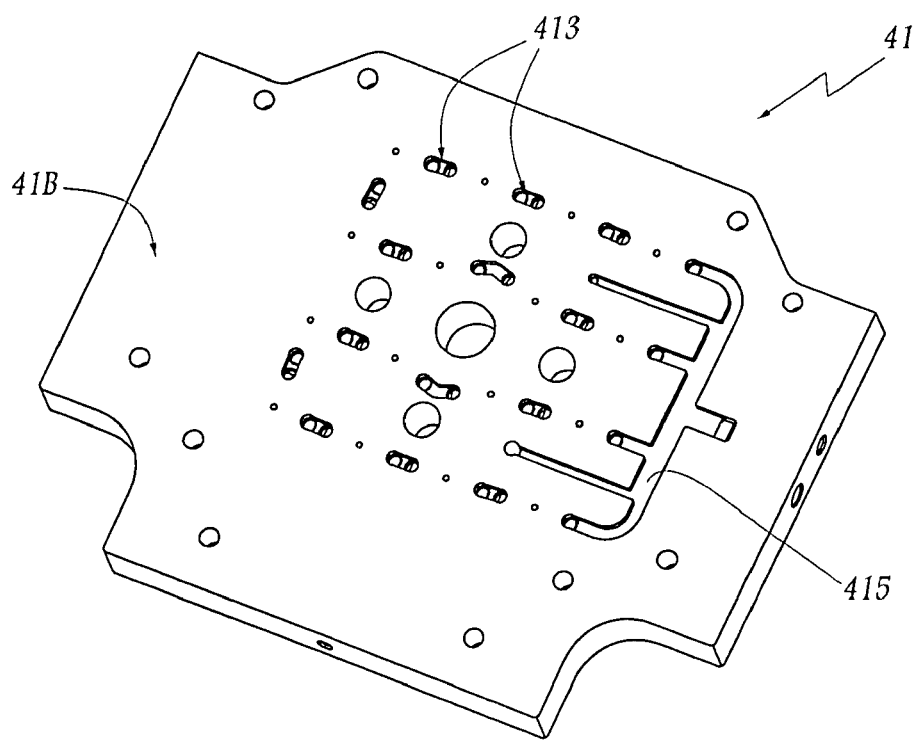
FIG. 11 is a view similar to FIG. 10, from the side of the rear face of the plate of FIG. 2.

As can be seen in FIG. 11, each plate 41 comprises, at its rear face 41B, on the opposite side to the clamping face 41A, housings 413 for receiving connectors 7A, 7B or 9, designed to electrically connect the magnetic pads 5 to one another and to the terminal block 47. The face 41B of each plate 41 also comprises grooves 415, provided to run the connecting wires between the end-of-circuit connectors 9 and the terminal block 47.

Figure 3:
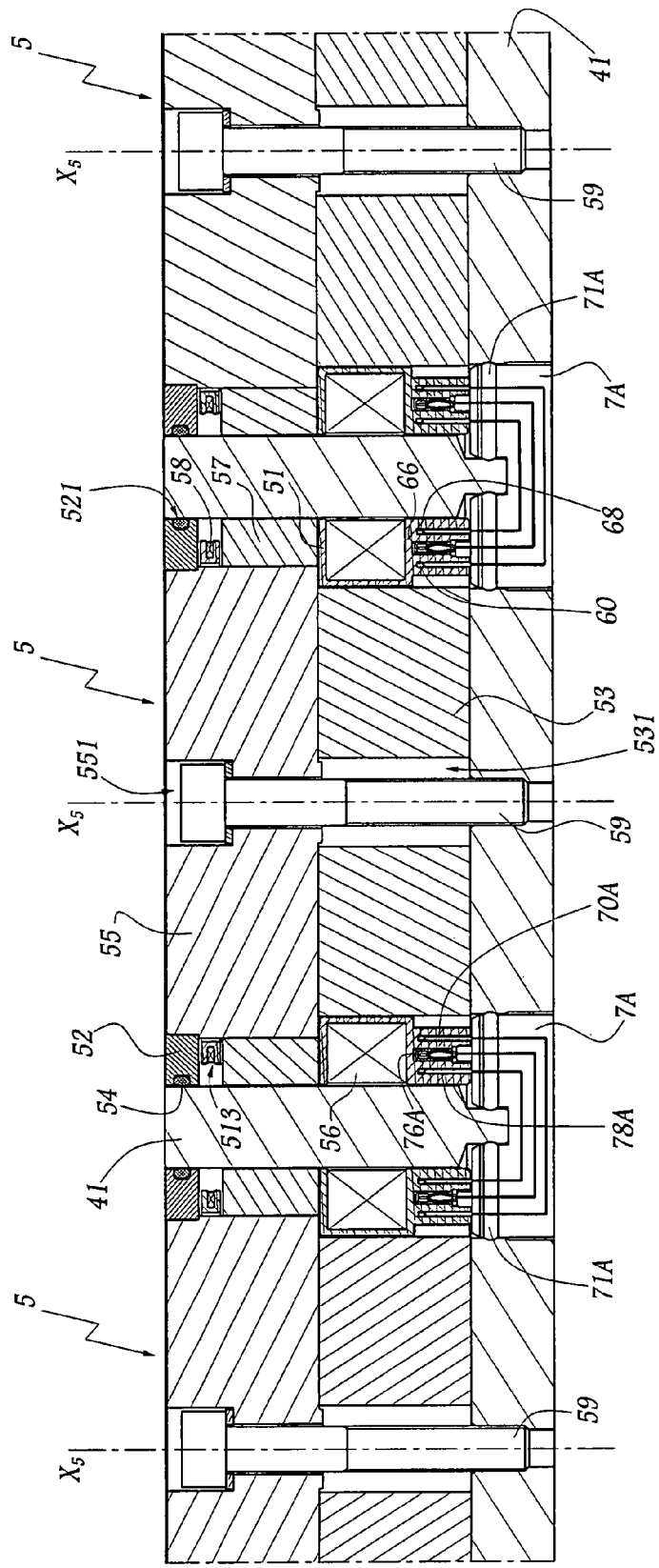
FIG. 3 is a section on a larger scale along the line III-III of FIG. 2.

The structure of each magnetic pad 5 of a plate 41 is more clearly visible in the section of FIG. 3. Each magnetic pad 5 is cylindrical with a central axis of revolution $X_5$. Each pad 5 comprises a casing 51, made of an insulating material, such as a plastic, that covers at its base a generally cylindrical permanent magnet 53. The magnet 53 is made of a suitably low coercive material, such as AlNiCo.

An external pole 55, designed to be flush with the clamping face 41A of the plate 41, is housed above the magnet 53. The pole 55 is made of a ferromagnetic material, such as steel. The magnet 53 and the steel pole 55 each comprise a central bore 531 or 551 designed for the passage of a screw 59 for fastening the pad 5 to the plate 41. Advantageously, the bottom of each housing 411 comprises a tapping, matching a thread of the screw 59.

The external pole 55 receives, along its external lateral wall, cylindrically-shaped permanent magnets 57, each magnet 57 being polarized radially relative to the pad 5. More precisely, each pad 5 comprises five magnets 57 in the shape of a portion of a cylindrical collar, which are housed in windows 512 of the casing 51. Each magnet 57 is made of a permanently magnetized material such as Neodymium Iron Boron or another highly coercive magnetic material and is kept in place on the external ferromagnetic pole 55 by magnetic attraction.

A power solenoid coil 56 is wound in an external peripheral groove 511 of the casing 51 around the permanent magnet 53. The magnet 53 and the solenoid coil 56 together form a switchable magnet.

In the absence of current in the power solenoid coil 56, the magnets of the pad 5 generate a magnetic field whose flux lines may extend towards the outside of the pad 5. When the pads 5 of a plate 41 are in this state that is called activated, the flux lines are capable of closing while travelling from the plate 41 to a mould to be clamped, the plate 41 then exerting a clamping force on this mould.

When the power solenoid coil 56 is adequately supplied, it generates a new magnetic field opposite to the magnetic field of the magnets. It then switches to a deactivated state, in which the flux lines are confined in the plate 41, the clamping force exerted by the plate 41 on the mould then being zero.

Each pad 5 of a plate 41 also comprises a ring 52 made of a non-magnetic material, such as brass, and sleeve-fitted around the steel pole 55. The ring 52 comprises an external peripheral groove 521, capable of receiving an O-ring 54 sealing the pad 5 on the clamping face 41A of the plate 41. In addition, each pad 5 comprises a solenoid coil 58, designed to measure the flux generated by the pad 5, that is wound in an external peripheral groove 513 of the casing 51 around the steel pole 55, in the vicinity of the ring 52. Such a position of the measurement solenoid coil 58 makes it possible to access the total flux generated by the pad 5. By combining the measurements of flux generated by each pad 5 of a plate 41 of the device 4, as set out in WO-A-03/009 972, it is possible to determine the clamping force exerted by the plate 41 on a mould to be clamped.

Figure 7:
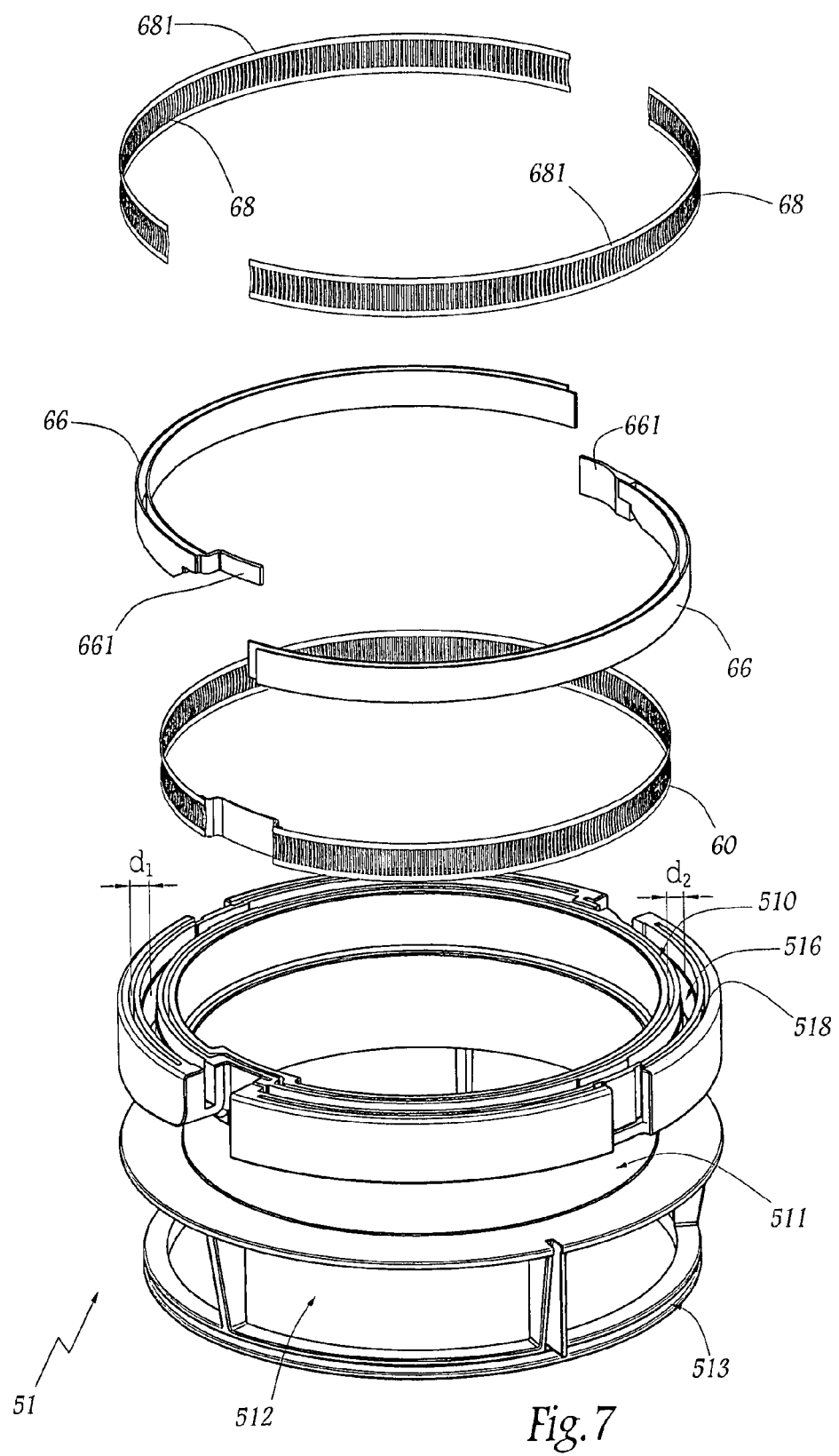
FIG. 7 is an exploded view in perspective and on a larger scale of elements making up a magnetic pad of the plate of FIG. 2.

At its end opposite to the groove 513, the casing 51 comprises three circumferential grooves for receiving connection terminals of the pad 5. As can be seen in FIG. 7, these terminals comprise a continuity terminal 60, two power terminals 66 and two measurement terminals 68. Each of these terminals is made of a conductive material.

The continuity terminal 60 is made of a single and closed piece, of circular shape and substantially matching a first circumferential groove 510 of the casing 51. The two power terminals 66 are each made of a semi-circular part, extending substantially over 180°. These two terminals 66 are capable of being received in a second circumferential groove 516 of the casing 51, in the extension of one another. Finally, the two measurement terminals 68 are each made of a semicircular part, extending substantially over 180°. The terminals 68 are capable of being received in a third circumferential groove 518 of the casing 51, in the extension of one another.

Each of the continuity terminal 60 and the measurement terminals 68 is designed to have contact strips for the purpose of a connection to the outside of the pad 5.

The ends of the power solenoid coil 56 are each soldered to a power terminal 66, at one end 661 of the latter. The ends of the measurement solenoid coil 58 are, for their part, each soldered in a mid-zone 681 of a measurement terminal 68.

Figure 2:
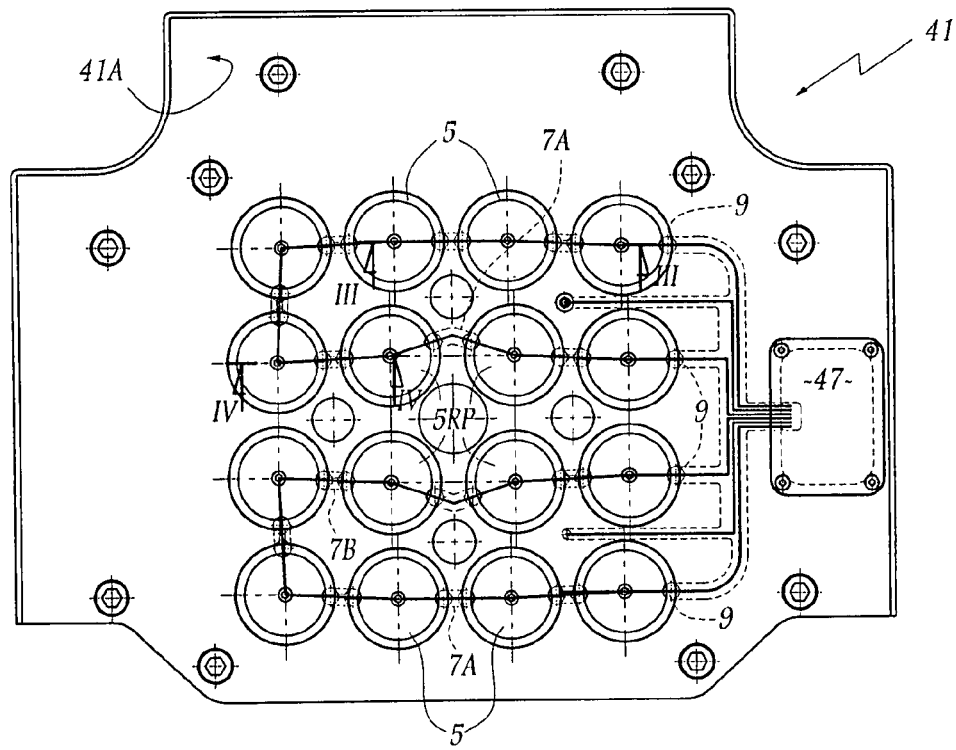
FIG. 2 is a front view on a larger scale of the clamping face of a plate of the magnetic clamping device visible in FIG. 1, the connections inside the plate being shown in thick lines.
Figure 6:
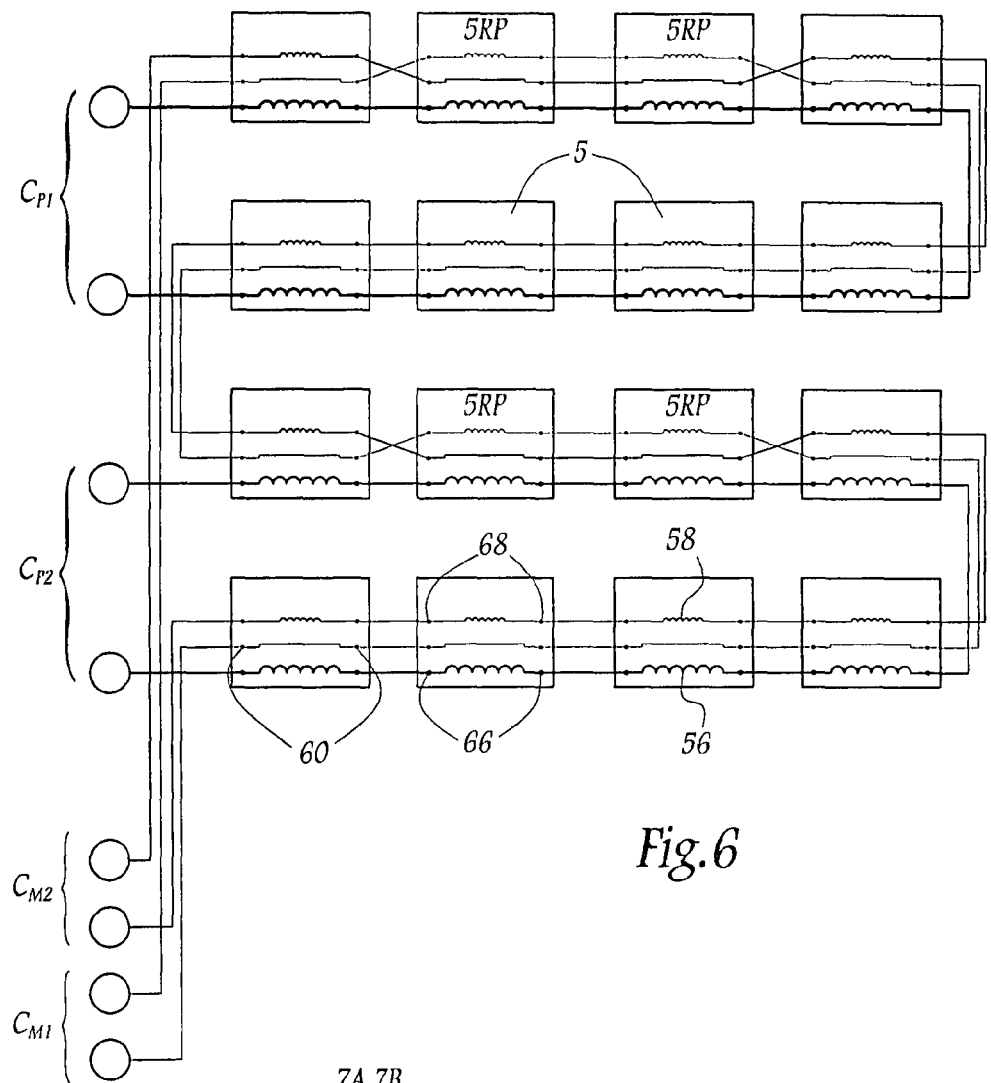
FIG. 6 is a schematic diagram of the various circuits established in the plate of FIG. 2.

The connections between the various pads 5 of each plate 41 are shown in FIG. 2 and in the schematic diagram of FIG. 6. The power solenoid coils 56 of the pads 5 are connected in series in two groups of eight solenoid coils, as shown in FIG. 6. More specifically, each power terminal 66 of a pad 5 is connected to a power terminal 66 of an adjacent pad 5 by means of a removable connector 7A or 7B. Two power circuits $C_{P1}$ and $C_{P2}$ are thus formed, each by associating in series the power solenoid coils 56 of eight pads 5. The power terminals 66 of the pads 5 situated at the end of each circuit $C_{P1}$ or $C_{P2}$ are connected to the terminal block 47 by means of removable end-of-circuit connectors 9. The circuits $C_{P1}$ and $C_{P2}$ can thus be connected to the power supply included in the control unit 43, via the cable 45 connected between the terminal block 47 and the control unit 43.

The measurement solenoid coils 58 of the pads 5 are also connected in series in two distinct groups. On the one hand, the solenoid coils 58 of four reference pads 5RP are connected in series to form a first reference flux measurement circuit $C_{M1}$. The reference pads 5RP are chosen in a central zone of the plate 41 that is most likely to be covered by a mould to be clamped. On the other hand, the solenoid coils 58 of the twelve other pads 5 are connected in series to form a second flux measurement circuit $C_{M2}$. The flux of the reference pads needs to be measured to be able to interpret the measurement of the combined flux of the other pads and determine the value of the clamping force exerted by each plate 41 of the device 4 on a mould to be clamped.

Each of the circuits $C_{M1}$ and $C_{M2}$ is obtained by connecting measurement terminals 68 or continuity terminals 60 of adjacent pads 5 to one another or to the terminal block 47, by means of removable connectors 7A, 7B or 9.

The reference flux measurement circuit $C_{M1}$ is formed by connecting in series the measurement terminals 68 of the four reference pads 5RP with one another and with the continuity terminals 60 of the twelve other pads 5 which makes it possible to short-circuit the measurement solenoid coils 58 of these twelve other pads 5. The second flux measurement circuit $C_{M2}$ is formed by connecting in series the measurement terminals 68 of the twelve standard pads 5, with one another or with the continuity terminals 60 of the four reference pads 5RP, which makes it possible to short-circuit the measurement solenoid coils 58 of these four reference pads 5RP. At the end of each circuit $C_{M1}$ and $C_{M2}$, the appropriate terminals amongst the continuity terminals 60 and the measurement terminals 68 of the pads 5 situated at the end of the circuits are connected to the terminal block 47 by means of removable end-of-circuit connectors 9. Therefore, each of the flux measurement circuits $C_{M1}$ and $C_{M2}$ is capable of being connected via a cable 45 to the control unit 43.

The control unit 43 comprises circuits for processing the flux measurement signals originating from the circuits $C_{M1}$ and $C_{M2}$ for the purpose of estimating the clamping force exerted by the plate 41 on a mould to be clamped. These processing circuits may in particular comprise amplifier, integrator and comparator circuits, as described in WO-A-03/009 972.

As can be seen in FIG. 2, a single connector 7A or 7B is provided for the simultaneous connection of three terminals, i.e. power terminal 66, measurement terminal 68 and continuity terminal 60, of two adjacent pads 5. Depending on whether the two adjacent pads 5 are or are not of the same kind amongst the reference pads 5RP and the other standard pads 5, the connector used to connect the terminals of these pads is of a first type 7A or of a second type 7B.

When the two pads 5 to be connected are of the same kind, for example two reference pads 5RP or two standard pads 5, the connection is made by means of a connector 7A of the first type. Such a connector 7A, more particularly visible in FIG. 3, is a double connector having a plug 71A at each of its ends. Each plug 71A comprises three pins 76A, 78A and 70A, each designed to be in contact with a corresponding power terminal 66, measurement terminal 68 or continuity terminal 60 of a pad 5. A connector 7A is provided for connecting together the terminals of the same kind of each of the two pads 5 connected by means of this connector 7A. More precisely, as shown in FIG. 3, a connector 7A connects a power terminal 66 of a first pad to a power terminal 66 of the second pad, a measurement terminal 68 of the first pad to a measurement terminal 68 of the second pad and the continuity terminal 60 of the first pad to the continuity terminal 60 of the second pad.

Figure 4:
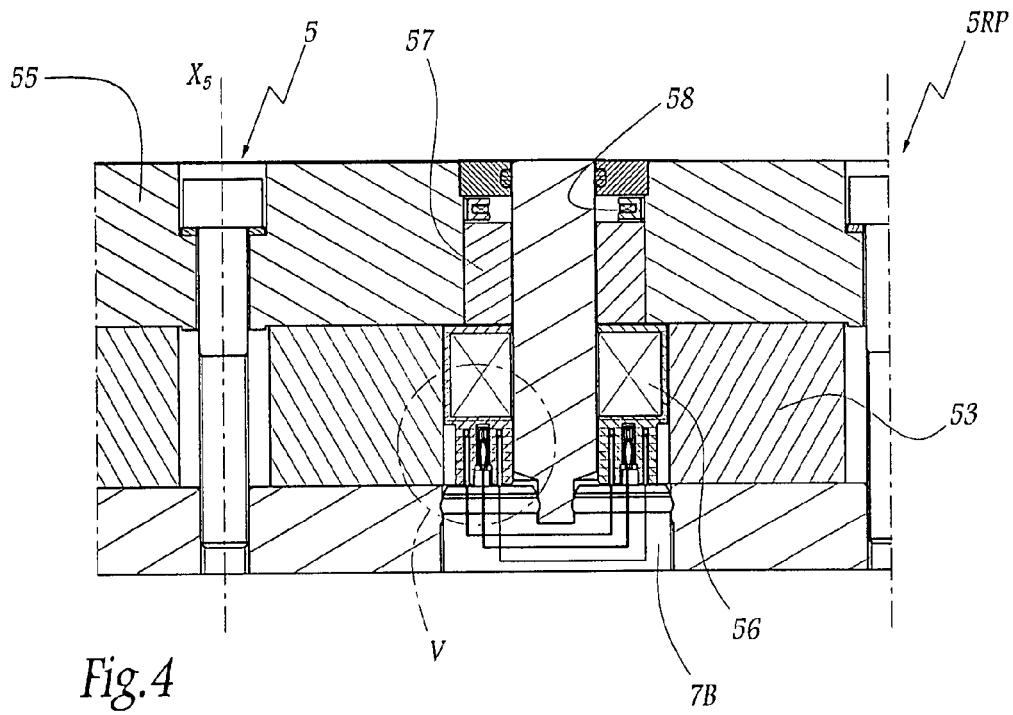
FIG. 4 is a section on a larger scale along the line IV-IV of FIG. 2.

When the two pads 5 to be connected are of different kinds, that is to say a reference pad 5RP and a standard pad 5, the connection is made by means of a connector 7B of the second type. Such a connector 7B, more particularly visible in FIG. 4, is a double connector having a plug 71B at each of its ends. Each plug 71B comprises three pins 76B, 78B and 70B each designed, in a manner similar to the connector 7A, to be in contact with a corresponding terminal of a pad 5. A connector 7B is provided to connect together power terminals 66 of the two pads connected by means of this connector 7B, and to connect a measurement terminal 68 of a first pad to the continuity terminal 60 of the second pad and vice-versa, as shown in FIG. 4.

Figures 8, 9:
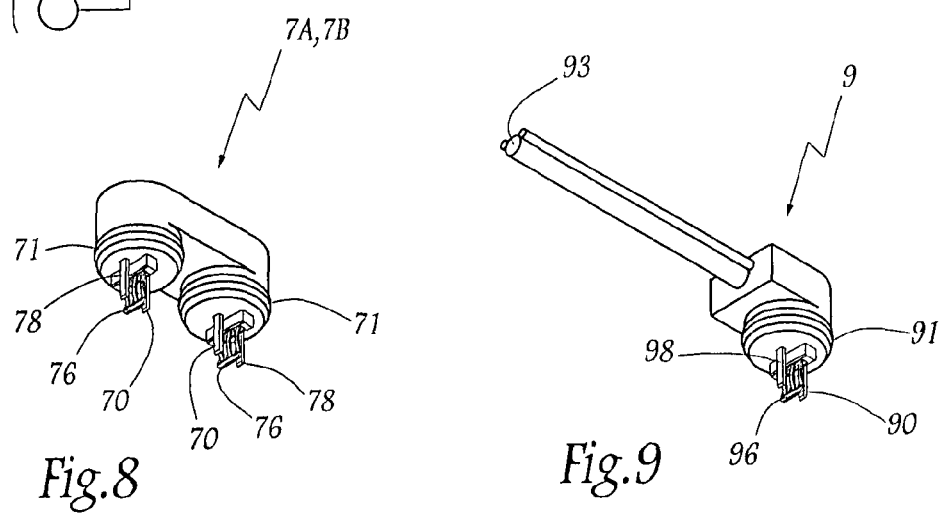
FIG. 8 is a view in perspective and on a larger scale of a connector for connection between two magnetic pads of the plate of FIG. 2.
FIG. 9 is a view on a larger scale of an end-of-circuit connector of the plate of FIG. 2.

Therefore, thanks to the two types of connectors 7A and 7B, it is possible to form simultaneously the two power circuits $C_{P1}$ and $C_{P2}$ and the two flux measurement circuits $C_{M1}$ and $C_{M2}$. The connections at the end of each of these circuits are made by means of a third type of removable connector 9, shown in FIG. 9. Such a connector 9 is a single connector having a single plug 91, from which a wire 93 of adaptable length extends, whose stripped end is capable of being connected to the terminal block 47. The plug 91 of a connector 9 comprises three pins 96, 98 and 90, each designed to be in contact with a corresponding power terminal 66, measurement terminal 68 or continuity terminal 60 of a pad 5 situated at the end of a power or flux measurement circuit.

Figure 5:
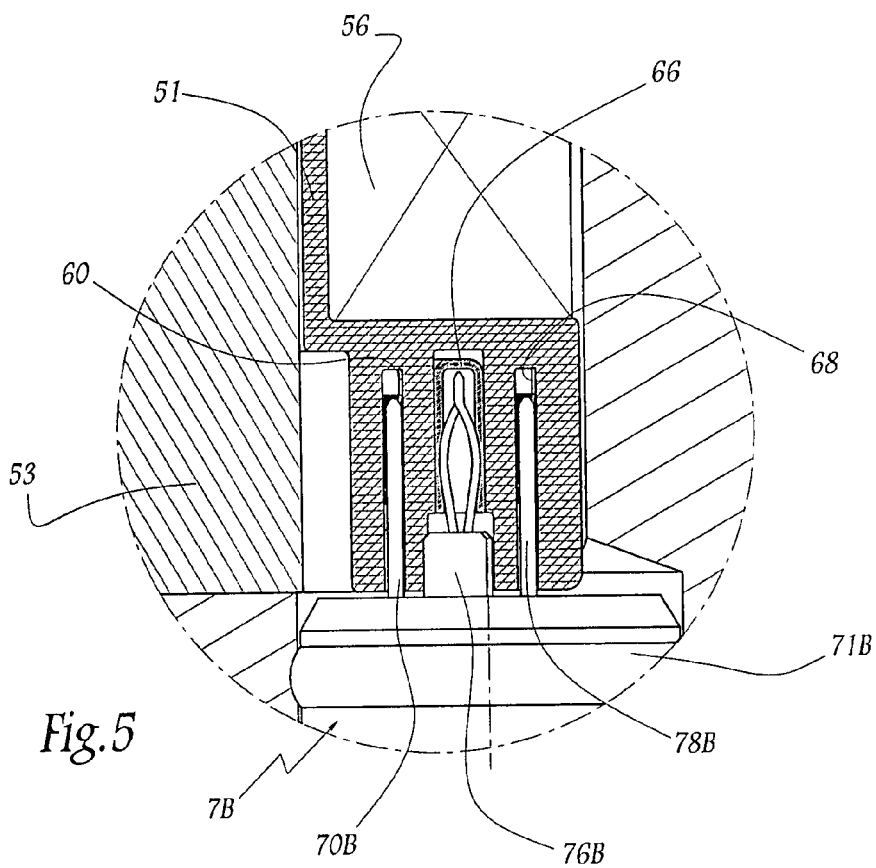
FIG. 5 is a view on a larger scale of the detail V of FIG. 4.

As can be seen in FIG. 5, the connection plugs 71A, 71B or 91 of the connectors 7A, 7B or 9 provide a perfect seal when they are put in place on the pads 5, without an additional operation assembly. As shown in this figure, the pins 78 and 70 of a connector 7, or similar of a connector 9, designed to be in contact with a measurement terminal 68 or continuity terminal 60 of a pad 5, are made up of single strips. Each pin 76 of a connector 7, or similar of a connector 9, designed to be connected with a power terminal 66 of a pad 5, is for its part made up of contact bars. Each power terminal 66 having a U-section, the pin 76 with bars of a connector 7, or similar of a connector 9, provides a contact on each branch of the U.

Thanks to the circular or semicircular shape of the terminals 60, 66 and 68 of each pad 5 and to their disposition in the concentric grooves 510, 516 and 518 of the casing 51, a connector 7A, 7B or 9 may be connected simultaneously to three terminals of different kinds of a pad 5, namely the continuity terminal 60, a power terminal 66 and a measurement terminal 68, over an angular sector with an apex angle of the order of 90°. Specifically, each measurement terminal 68 and power terminal 66 of a pad 5 extends over an angular sector with an apex angle of the order of 180°. The ends of the measurement solenoid coil 58 are each soldered in the mid-zone 681 of a measurement terminal 68. A connector cannot be placed in this mid-zone 681 of each terminal 68. Each pad 5 then comprises four connection portions each capable of receiving a connector 7A, 7B or 9, each connection portion extending over an angular sector with an apex angle of the order of 90°. As a variant, each connection portion may extend over an angular sector with an apex angle different from 90°, provided that this apex angle is greater than or equal to 45°.

On each connection portion, a connector 7A, 7B or 9 is capable of being connected simultaneously with three terminals of different kinds. When the terminals 60, 66 and 68 are in place respectively in the grooves 510, 516 and 518, the radial distance $d_1$, between each measurement terminal 68 and the adjacent power terminal 66, on the one hand, and the radial distance $d_2$ between each power terminal 66 and the continuity terminal 60, on the other hand, are constant in each connection portion, that is to say over an angular sector with an apex angle of the order of 90°. In addition, each of these distances $d_1$ and $d_2$ is identical from one connection portion to another, that is to say from one angular sector to another.

A method for manufacturing a plate 41 of a magnetic clamping device 4 according to the invention comprises steps in which:

First of all, from the clamping face 41A of the plate 41, the sixteen pads 5 are inserted into the housings 411 of the plate 41 and these pads 5 are immobilized relative to the plate 41 by means of fastening screws 59. The terminal block 47 is also inserted into the housing 417 of the plate 41 provided for this purpose.

Then, the connections between the pads 5 are made in order to form the two power circuits $C_{P1}$ and $C_{P2}$ and the two flux measurement circuits $C_{M1}$ and $C_{M2}$. The connections are made between the pads 5 by inserting the connectors 7A and 7B in the housings 713 of the plate 41, provided for this purpose straddling two housings 411 of pads 5 and accessible from the rear face 41B on the opposite side to the clamping face 41A. In addition, end-of-circuit connectors 9 are placed in the housings 413 adjacent to the pads S situated at the end of the circuits and the connection wires 93 emerging from these connectors 9 are placed in the grooves 415 of the plate 41 and run towards the terminal block 47.

In the embodiment represented, the flux measurement circuits $C_{M1}$ and $C_{M2}$ are each made of two groups of eight pads 5. Between the pairs of adjacent pads 5 of each group, connectors of type 7A or 7B are put in place. The pads 5 of each group situated in the vicinity of the terminal block 47 each receive a connector of type 9, whose connection wire 93 is connected to the terminal block 47 that houses the connections necessary to place the circuits of the two groups of eight pads 5 in series with one another.

Finally, a cable 45 is connected between the terminal block 47 and the control unit 43 of the device 4.

A magnetic clamping device 4 according to the invention has the advantage of limiting the number of parts used during its manufacture and of allowing an easy connection between the pads 5, thanks to the removable connectors 7A, 7B or 9. These three types of connectors make it possible to connect the pads 5 in series easily and uniformly for all the pads 5, which reduces the complexity of the connections and the time for manufacturing the clamping plate 41. The connection of the pads with one another is removable, sealed and requires no soldering or crimping. Thus, the time and cost for manufacturing a plate 41 of a device 4 according to the invention is limited, with a high quality level of the device obtained.

Furthermore, the pads 5 all have an identical space requirement and connection interface. Each pad 5 is cylindrical, which allows a freedom of orientation of the pad in its housing 411. Each pad 5 is designed to receive two connectors that may be connected with a variable relative angular distance, lying between approximately 20° and 180°. In other words, the connection of a pad 5 is positionally configurable. As an example, in the embodiment represented, the angular zone of connection of each pad 5 is exploited in order to vary the relative positions of the inputs and outputs of each pad 5. Specifically, in one and the same row of pads 5, the input and the output are placed at approximately 180° relative to one another, while the connection of two pads of different rows uses an input and an output placed at approximately 90° relative to one another. This possibility of connecting a pad 5 in a large angular zone makes it possible to optimize the placement of the poles of each magnetic pad 5 and thus maximize the magnetic output of each plate 41 of the device 4.

The clamping face 41A of each plate 41 may be machined to ensure a good flatness. Thanks to the seals 54 contained in the grooves of the rings 52 for closing the pads 5, this machining may be carried out without risk of damaging the internal components of the pads 5.

The invention is not limited to the example described and represented. In particular, in the context of the embodiment described, the connectors 7A and 7B all have an identical separation of their plugs 71. As a variant, the separation of the plugs 71 of these connectors may be different from one connector to another. Additionally, according to a variant not shown of the invention, the measurement solenoid coil 58 of each pad 5 may surround the power solenoid coil 56 of this pad, instead of being placed at the apex of the pad.

According to another variant not shown of the invention, only the flux measurement circuits $C_{M1}$ and $C_{M2}$ may use removable connectors 7A, 7B and 9 according to the invention, the power circuits $C_{P1}$ and $C_{P2}$ then being wired in a conventional manner, that is to say with the connection wires soldered or crimped to the power solenoid coils 56 of each pad 5 and placed in grooves of the plate 41. In this variant, it is not necessary to provide power terminals 66 for the pads 5.

According to yet another variant not shown of the invention, each pad 5 may comprise only a power solenoid coil 56 and no measurement solenoid coil. In this case, only the power circuit or circuits $C_{P1}$ and $C_{P2}$ are made by means of the removable connectors 7A, 7B and 9.

The magnetic clamping device 4 according to the invention has been described in the context of an injection moulding machine. However, such a device 4 can be transposed to many other applications, and in particular for industrial installations requiring the clamping of parts with a considerable, reversible and controlled force.

The invention claimed is:

1. Magnetic clamping device comprising a clamping support and at least two magnetic pads housed in the support, each pad including a magnet that can be switched between an activated state, in which magnetic flux lines generated by the pad extend towards an outside of the clamping device, and a deactivated state, in which the magnetic flux lines are confined in the clamping device, each pad further including at least one solenoid coil having opposite ends, each end of the at least one solenoid coil being connected to a terminal, wherein the terminals of at least two pads are connected to each other by a removable connector.

2. Magnetic clamping device according to claim 1, wherein each pad includes a measurement solenoid coil for measuring magnetic flux generated by the pad, opposite ends of the measurement solenoid coil being connected to a measurement terminal, the measurement terminals of the at least two pads being connected to each other by the removable connector.

3. Magnetic clamping device according to claim 2, including a plurality of pads wherein a number of the pads are reference pads whose measurement terminals are connected in series by the removable connectors to form a first flux measurement circuit, the measurement terminals of the other pads being connected in series by the removable connectors to form a second flux measurement circuit, the measurement terminals in the first and second measurement circuits being connected to one another and to a control unit by means of different removable connectors.

4. Magnetic clamping device according to claim 3, wherein each pad includes a continuity terminal and is connected to at least one adjacent pad in the support by one of the removable connectors, the removable connectors being of a first type for connecting two pads of the same kind amongst the reference pads and the other pads, and of a second type for connecting a reference pad to one of the other pads.

5. Magnetic clamping device according to claim 4, wherein the removable connectors of the said first type connect terminals of the same kind amongst the measurement terminals and the continuity terminals of two adjacent pads, while removable connectors of the second type connect terminals of different kinds of two adjacent pads.

6. Magnetic clamping device according to claim 1, wherein the magnet of each pad includes a permanent magnet surrounded by a power solenoid coil, each end of the power solenoid coil being connected to a power terminal, the power terminals of the at least two pads being connected to each other by one of the removable connector.

7. Magnetic clamping device according to claim 4, wherein the magnet of each pad includes a permanent magnet surrounded by a power solenoid coil, each end of the power solenoid coil being connected to a power terminal, the power terminals of at least two pads being connected to each other by one of the removable connectors, and wherein the removable connectors have at least one plug furnished with three pins for connection, respectively, to a measurement terminal, a continuity terminal and a power terminal of a pad.

8. Magnetic clamping device according to claim 4, wherein the magnet of each pad includes a permanent magnet surrounded by a power solenoid coil, each end of the power solenoid coil being connected to a power terminal, the power terminals of at least two pads being connected to each other by one of the removable connectors, and wherein each terminal of a pad extends over an angular sector with an apex angle greater than or equal to 45°, each pad including at least two connection portions for connecting a connector, each connection portion extending over an angular sector with an apex angle greater than or equal to 45°, the removable connectors being capable of being connected simultaneously to three terminals, respectively, a measurement terminal, a continuity terminal and a power terminal, on each of the connection portions.

9. Magnetic clamping device according to claim 8, wherein a relative radial distance between the measurement terminals and power terminals of a pad and a relative radial distance between the power terminals and continuity terminals is constant in each connection portion and identical from one connection portion to another.

10. Magnetic clamping device according to claim 4, wherein the magnet of each pad includes a permanent magnet surrounded by a power solenoid coil, each end of the power solenoid coil being connected to a power terminal, the power terminals of at least two pads being connected to each other by one of the removable connectors, and wherein each pad includes two semicircular measurement terminals and two semicircular power terminals, the continuity terminal of each pad being of circular shape and closed, the measurement terminals, continuity terminal and power terminals being placed concentrically relative to one another.

11. Magnetic clamping device according to claim 10, wherein each pad has a cylindrical insulating casing, the casing including three concentric circumferential grooves for receiving, respectively, the measurement terminals, the continuity terminal and the power terminals of the pad.

12. Magnetic clamping device according to claim 10, wherein the ends of the measurement solenoid coil are connected to each measurement terminal in a mid-zone of the measurement terminal.

13. Magnetic clamping device according to claim 1, wherein the support includes housings for receiving the at least two pads and housings for receiving the removable connectors.

14. An injection molding machine, comprising a magnetic clamping device including a clamping support and at least two magnetic pads housed in the support, each pad having a magnet that can be switched between an activated state, in which magnetic flux lines generated by the pad extend towards an outside of the clamping device, and a deactivated state, in which the magnetic flux lines are confined in the clamping device, each pad further including at least one solenoid coil having opposite ends, each end of the at least one solenoid coil being connected to a terminal, wherein the terminals of at least two pads are connected to each other by a removable connector.

15. Method for manufacturing a magnetic clamping device according to claim 1, comprising the steps of:
   a) inserting pads into housings of the support and immobilizing these pads relative to the support;
   b) connecting the pads to one another and to a control unit by inserting removable connectors into housings of the support in such a way as to place connector pins of the removable connector in contact with the terminals of the pads.

* * * * *